United States Patent [19]

Hester, Jr.

[11] 3,912,753

[45] Oct. 14, 1975

[54] 1-AMINOALKYLOXY, 1-AMINOALKYLTHIO AND 1-AMINOALKYLAMINO-4H-S-TRIAZOLO-[4,3-A][1,4] BENZODIAZEPINES

[75] Inventor: Jackson B. Hester, Jr., Galesburg, Mich.

[73] Assignee: The Upjohn Company, Kalamazoo, Mich.

[22] Filed: May 28, 1974

[21] Appl. No.: 473,684

[52] U.S. Cl.. 260/308 R; 260/247.1; 260/247.5 EP; 260/268 TR; 260/293.59; 260/308 C; 424/248; 424/250; 424/267; 424/269
[51] Int. Cl.² .................................... C07D 487/04
[58] Field of Search..... 260/308 R, 293.59, 268 TR, 260/247.1 L, 247.5 EP

[56] References Cited
FOREIGN PATENTS OR APPLICATIONS
2,220,739  11/1972  Germany.................. 260/308 R

*Primary Examiner*—Alton D. Rollins
*Attorney, Agent, or Firm*—William A. Hodes; John T. Reynolds

[57] ABSTRACT

This invention relates to novel compounds of the formula

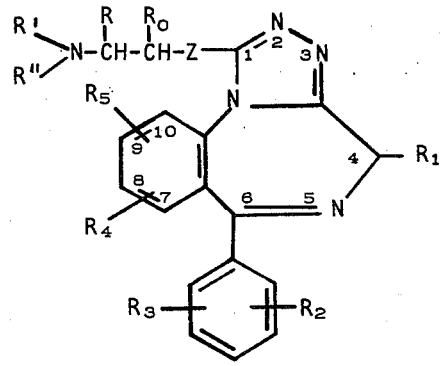

wherein Z is selected from the group consisting of O, S and N—R''' wherein R''' is lower alkyl of 1 through 3 carbon atoms; R, $R_0$ and $R_1$ are selected from the group consisting of hydrogen and lower alkyl of 1 through 3 carbon atoms; R' and R'' are selected from the group consisting of hydrogen, lower alkyl of 1 through 3 carbon atoms and when taken together with

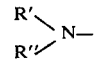

is a saturated heterocyclic amino radical selected from the group consisting of pyrrolidino, piperidino, morpholino, and 4-lower alkylpiperazino wherein lower alkyl is of 1 through 3 carbon atoms, with the proviso that R' and R'' cannot be hydrogen when Z is N—R'''; $R_2$, $R_3$, $R_4$ and $R_5$ are selected from the group consisting of hydrogen, lower alkyl of 1 through 3 carbon atoms, fluorine, chlorine, bromine, nitro, trifluoromethyl, and lower alkylthio of 1 through 3 carbon atoms; and pharmacologically acceptable acid addition salts thereof.

The new products of Formula I, including their pharmacologically acceptable acid addition salts, are useful as sedatives, tranquilizers, muscle relaxants, hypnotics, anti-convulsants, anxiolytics in mammals and birds.

9 Claims, No Drawings

1-AMINOALKYLOXY, 1-AMINOALKYLTHIO AND 1-AMINOALKYLAMINO-4H-S-TRIAZOLO-[4,3-A][1,4] BENZODIAZEPINES

BRIEF SUMMARY OF THE INVENTION

This invention relates to new organic compounds and is particularly concerned with novel compounds embraced by the formula

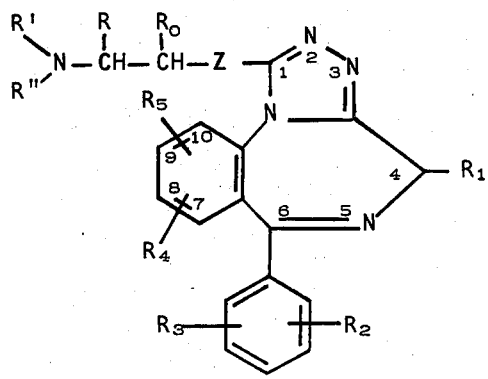

wherein Z is selected from the group consisting of O, S and N—R''' wherein R''' is lower alkyl of 1 through 3 carbon atoms; R, $R_0$ and $R_1$ are selected from the group consisting of hydrogen and lower alkyl of 1 through 3 carbon atoms; R' and R'' are selected from the group consisting of hydrogen, lower alkyl of 1 through 3 carbon atoms and when taken together with

is a saturated heterocyclic amino radical selected from the group consisting of pyrrolidino, piperidino, morpholino, and 4-lower alkylpiperazino wherein lower alkyl is of 1 through 3 carbon atoms with the proviso that R' and R'' cannot be hydrogen when Z is N—R'''; $R_2$, $R_3$, $R_4$ and $R_5$ are selected from the group consisting of hydrogen lower alkyl of 1 through 3 carbon atoms, fluorine, chlorine, bromine, nitro, trifluoromethyl and lower alkylthio of 1 through 3 carbon atoms; and a pharmacologically acceptable acid addition salt thereof.

The preferred compounds of this invention are those having the formula

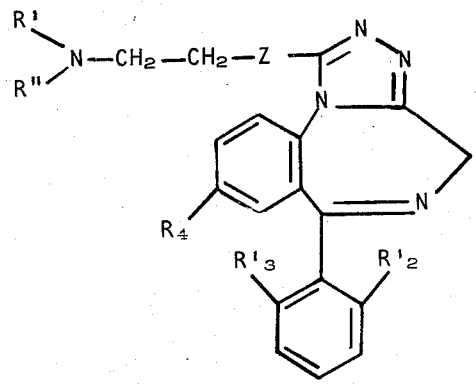

which embraces those of the formulae

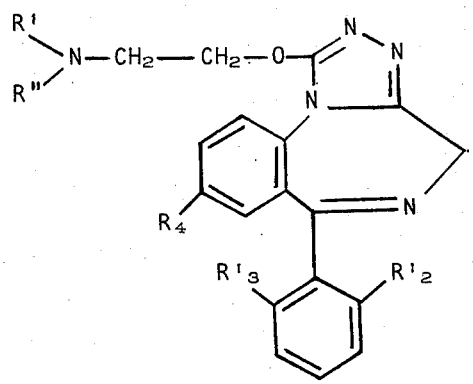

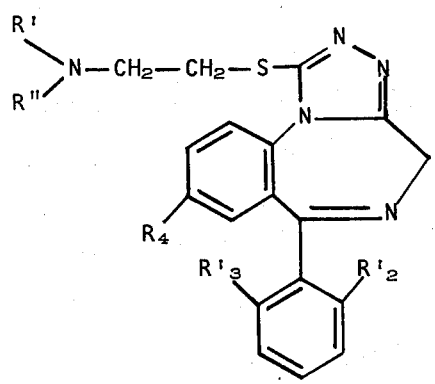

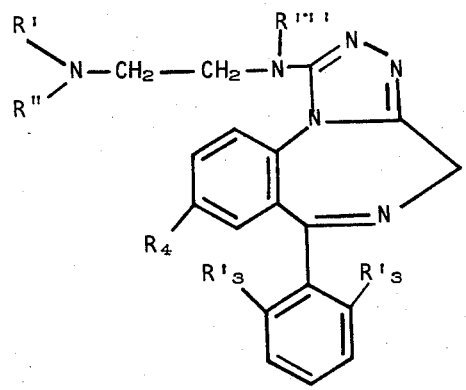

wherein Z, R''' and $R_4$ have the same meaning as above, R' and R'' are hydrogen or lower alkyl of 1 through 3 carbon atoms with the proviso that R' and R'' cannot be hydrogen in compounds of formula I'c and $R'_2$ and $R'_3$ are hydrogen, fluorine or chlorine.

The novel 6-phenyl-4H-s-triazolo[4,3-a][1,4]benzodiazepines of Formula I exist either in the non-protonated (free base) form or in the protonated (acid addition salt) form, depending on the pH of the environment. They form stable protonates, i.e., pharmacologically acceptable acid addition salts, on acidification of the free base form with suitable pharmacologically acceptable acids, for example, hydrochloric, hydrobromic, sulfuric, phosphoric, nitric, acetic, propionic, palmitic, benzoic, salicylic, hexynoic, phenylbutyric, naphthoic, glycolic, succinic, nicotinic, tartaric, maleic, malic, pamoic, methanesulfonic, cyclohexanesulfonic, citric and lactic acids, and the like. Conversely, the free base of the novel compounds of Formula I can be obtained from a salt (e.g., from the hydrochloride or sulfate salt) by neutralization with a base such as sodium hydroxide, extracting with an immiscible solvent, for example chloroform, drying the extract, for example with anhydrous sodium sulfate, and removing the solvent by evaporation.

The novel compounds (Ia) of this invention and a process for their preparation are illustratively represented as follows:

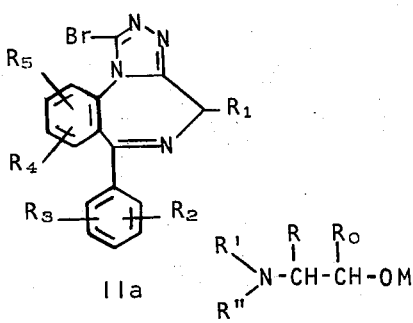

wherein M is an alkali metal (e.g., lithium, sodium or potassium) and R, $R_0$, R', R'', $R_1$, $R_2$, $R_3$, $R_4$ and $R_5$ have the same meaning as above.

The process for producing the compounds (I) of this invention (wherein Z is O) comprises reacting a compound of Formula IIa (prepared as in U.S. Pat. No. 3,709,899) with an alkali metal salt of an appropriate amino alcohol, employing an excess of said amino alcohol as solvent. The alkali metal salts of the aforesaid amino alcohols are prepared by the reaction of an appropriate amino alcohol with a suitable alkali metal or alkali metal hydride. The thus produced salt need not be isolated, and the 1-bromo starting compound (IIa) can be added directly to the reaction mixture. The reaction is carried out at between about 20° to about 100° C. for from about 6 to about 24 hours.

The novel compounds (Ib) of this invention and a process for their preparation are illustratively represented as follows:

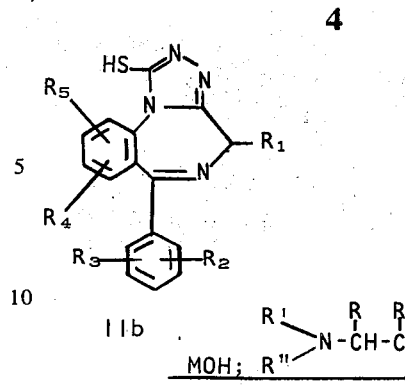

wherein M is an alkali metal, X is chlorine or bromine, and R, $R_0$, R', R'', $R_1$, $R_2$, $R_3$, $R_4$ and $R_5$ have the same meaning as above.

The process for producing the compounds (I) of this invention (wherein Z is S) comprises reacting a compound of Formula IIb (prepared as in U.S. Pat. No. 3,751,426) with an alkali metal hydroxide (e.g., sodium hydroxide, potassium hydroxide or lithium hydroxide) in a solvent (e.g., a mixture of lower alkanols, dimethylformamide or dimethylsulfoxide and water) and an excess of an appropriate dialkylaminoalkyl halide. The starting compound (IIb) is first reacted with an aqueous solution of an alkali metal hydroxide and the appropriate dialkylaminoalkyl halide can be added directly to the reaction mixture. The reaction is carried out at between about 20° to about 50° C. for from about ½ to about 2 days.

The novel compounds (Ic) of this invention and a process for their preparation are illustratively represented as follows:

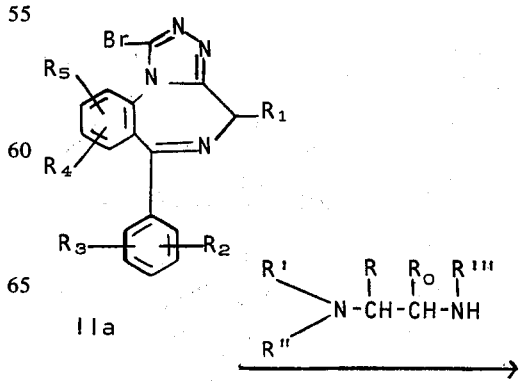

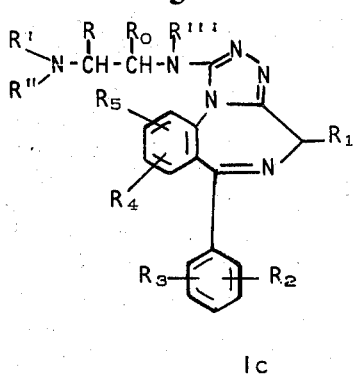

Ic wherein R, $R_0$, R', R'', R''', $R_1$, $R_2$, $R_3$, $R_4$ and $R_5$ have the same meaning as above.

The process for producing the compounds (Ic) of this invention

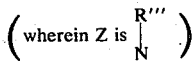

(wherein Z is $\underset{N}{\overset{R'''}{|}}$)

comprises reacting a compound of Formula IIa (prepared as in U.S. Pat. No. 3,709,899) with a compound of the formula

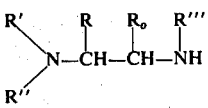

wherein R, $R_o$, R', R'' and R''' have the same meaning as above with the proviso that R' and R'' cannot be hydrogen, employing an excess of said compound as solvent. The reaction is carried out at between about 100° to about 150° C. for from about 1 to about 6 days.

All of the compounds included within Formula I(a, b and c), above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by crystallization; elution chromatography from an adsorbent column with a suitable solvent such as acetone, chloroform, ethyl acetate, ether, methylene chloride, methanol and Skellysolve B (hexanes), mixtures and combinations of these solvents; also by gradient elution chromatography from an adsorbent column with a suitable mixture of solvents, such as, methylene chloride-Skellysolve B, acetone-Skellysolve B, and the like.

The free bases and pharmacologically acceptable acid addition salts of the compound of Formula I (a, b and c) are useful as central nervous system (CNS) depressants when administered to mammals and birds. The aforesaid compounds in free base form or their acid addition salts can be used as sedatives, hypnotics, anti-convulsants, tranquilizers, muscle relaxants and anxiolytics in animals and birds. These compounds I (a, b and c) have been shown to possess CNS depressing activity via the loss of righting reflex, traction, chimney, dish and pedestal tests carried out in the manner described by Bossier et al. in Medicina Experimentalis 4, 145 (1961).

The pharmaceutical forms contemplated by this invention include pharmaceutical compositions suited for oral, parenteral and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like can be used as carriers or for coating purposes. Water or oil, e.g., coconut oil, sesame oil, safflower oil, cottonseed oil, peanut oil can be used for preparing solutions or suspensions of the active drug. Sweetening, coloring and flavoring agents can be added.

A preparation containing the compounds of Formula I (a, b and c) as active substance, e.g., a tablet or a powder, is favorably brought into a suitable unit dosage form.

As sedatives, hypnotics, anti-convulsants, tranquilizers, muscle relaxants, anxiolytics and anti-depressants, the compounds of Formula I (a, b and c) and their pharmacologically acceptable acid addition salts can be prepared and administered to mammals, birds and animals in a wide variety of oral or parenteral dosage forms, singly or in admixture with other coating compounds, in unit doses of from about 0.1 to about 10 mg./kg., depending on the severity of the condition being treated and the recipient's response to the medication. However, the preferred unit dosages are from about 0.1 to about 2 mg./kg. The aforesaid compounds, in oral or injectable preparations, can be used to alleviate tension, anxiety and depression in mammals or birds, such as, for example, occurs when travelling. These compounds are particularly useful for the treatment of anxiety in mammals and birds.

DETAILED DESCRIPTION

The following examples are illustrative of the manner of making and using the invention and set forth the best mode contemplated by the inventor of carrying out his invention, but are not to be construed as limiting the scope thereof, as obvious modifications and equivalents will be apparent to those skilled in the art, and the invention is therefore to be limited only by the scope of the appended claims.

EXAMPLE I

8-Chloro-1-[2-(dimethylamino)ethoxy]-6-phenyl-4H-s-triazolo[4,3-a][1,4]benzodiazepine (Ia)

A mixture of 50 ml. of 2-(dimethylamino)ethanol (prepared as in J. Chem. Soc. 1927, 1012) and 0.463 g. (0.011 mole) of 57% mineral oil suspension of sodium hydride, under nitrogen, is stirred for about 10 minutes at ambient temperature and treated with 3.73 g. (0.01 mole) of 1-bromo-8-chloro-6-phenyl-4H-s- triazolo[4,3-a][1,4]-benzodiazepine (IIa) (prepared as in Example 2 of U.S. Pat. No. 3,709,899). This mixture is maintained at ambient temperature for about 18 hours, then diluted with water and extracted with chloroform. The extract is washed with brine, dried with potassium carbonate and concentrated under vacuum. The residue is chromatographed on a 350 g. column of silica gel (precipitated silicic acid) with 4% methanol: 96% chloroform. The thus obtained product is crystallized from ethyl acetate: Skellysolve B to give 8-chloro-1-[2-(dimethylamino)ethoxy]-6-phenyl-4H-s-triazolo[4,3-a][1,4]benzodiazepine (Ia), 0.77 g. having a melting point of 139° to 143° C. and 0.1 g. having a melting point of 139° to 142° C. The analytical sample melted at 140.5° to 142° C.

Anal. Calcd. for $C_{20}H_{20}ClN_5O$: C, 62.90; H, 5.28; Cl, 9.28; N, 18.34. Found: C, 62.84; H, 5.25; Cl, 9.39; N, 18.55

EXAMPLE 2

8-Chloro-1-[2-(diethylamino)ethoxy]-6-phenyl-4H-s-triazolo[4,3-a][1,4]benzodiazepine (Ia)

A mixture of 50 ml. of 2-(diethylamino) ethanol (prepared as in J. Amer. Chem. Soc. 47, 1394) and 0.463 g. (0.011 mole) of a 57% mineral oil suspension of sodium hydride, under nitrogen, is stirred for about 10 minutes at ambient temperature and treated with 3.73 g. (0.01 mole) of 1-bromo-8-chloro-6-phenyl-4H-s-triazolo[4,3-a][1,4]benzodiazepine (IIa). The resulting mixture is kept at ambient temperature for about 18 hours, diluted with water and extracted with chloroform. The extract is washed with brine, dried with potassium carbonate and concentrated under vacuum. The residue is chromatographed on a 350 g. column of silica gel with 5% methanol: 95% chloroform. The resulting product is crystallized from ethyl acetate: Skellysolve B to give 8-chloro-1-[2-(diethylamino)ethoxy]-6-phenyl-4H-s-triazolo[4,3-a][1,4]benzodiazepine (Ia), 0.44 g. having a melting point of 110° to 115° C. and 0.6 g. having a melting point of 116° to 118° C. The analytical sample has a melting point of 114°–117° C.

Anal. Calcd. for $C_{22}H_{24}ClN_5O$: C, 64.46; H, 5.90; Cl, 8.65; N, 17.09. Found: C, 64.69; H, 6.17; Cl, 8.65; N, 17.38.

Following the procedures of Examples 1 and 2, but substituting other known representative 1-bromo compounds of Formula IIa as starting materials, and using the same or other dialkylaminoalkanols, the same or other alkali metal hydrides (or alkali metals), such as
1. 1-bromo-8-chloro-6-(o-chlorophenyl)-4H-s-triazolo[4,3-a][1,4]benzodiazepine (IIa), potassium hydride and 2-(dimethylamino)-1-propanol,
2. 1-bromo-8-chloro-6-(2,6-difluorophenyl)-4H-s-triazolo[4,3-a][1,4]benzodiazepine (IIa), lithium hydride and 2-(dipropylamino)-1-butanol,
3. 1-bromo-6-(2-fluoro-6-chlorophenyl)-8-nitro-4H-s-triazolo[4,3-a][1,4]benzodiazepine (IIa), sodium and 2-(ethylmethylamino)-1-pentanol,
4. 1-bromo-6-(o-chlorophenyl)-8-trifluorometheyl-4H-s-triazolo[4,3-a][1,4]benzodiazepine (IIa), potassium and 2-(ethylpropylamino)ethanol,
5. 1-bromo-10-ethyl-6-phenyl-4H-s-triazolo[4,3-a][1,4]benzodiazepine (IIa), lithium and 2-(ethylmethylamino)-1-propanol,
6. 1-bromo-8-ethylthio-6-(o-fluorophenyl)-4H-s-triazolo[4,3-a][1,4]benzodiazepine (IIa), sodium hydride and 2-(methylpropylamino)-1-butanol,
7. 1-bromo-6-[p-(trifluoromethyl)phenyl]-4H-s-triazolo[4,3-a][1,4]benzodiazepine (IIa), potassium hydride and 2-(dipropylamino)-1-pentanol,
8. 1-bromo-8,9-di(ethylthio)-6-(o-fluorophenyl)-4H-s-triazolo[4,3-a][1,4]benzodiazepine (IIa), lithium hydride and 2-(diethylamino)ethanol,
9. 1-bromo-8,10-dichloro-6-(2,6-dichlorophenyl)-4H-s-triazolo[4,3-a][1,4]benzodiazepine (IIa), sodium and 2-(dipropylamino)ethanol,
10. 1-bromo-8-chloro-10-nitro-6-phenyl-4H-s-triazolo[4,3-a][1,4]benzodiazepine (IIa), potassium and 2-(methylpropylamino)ethanol,
11. 1-bromo-6-[o-(propylthio)phenyl]-8-nitro-10-trifluoromethyl-4H-s-triazolo[4,3-a][1,4]benzodiazepine (IIa), lithium and 2-(dimethylamino)-1-propanol,
12. 1-bromo-6-(2-methyl-4-trifluoromethylphenyl)-8-methylthio-4H-s-triazolo[4,3-a][1,4]benzodiazepine (IIa), sodium hydride and 2-(ethylmethylamino)-1-butanol,
13. 1-bromo-8-chloro-6-(o-chlorophenyl)-4-ethyl-4H-s-triazolo[4,3-a]1,4]benzodiazepine (IIa), potassium hydride and 2-(dipropylamino)-1-pentanol,
14. 1,10-dibromo-6-(2-chloro-6-fluorophenyl)-4-methyl-8-nitro-4H-s-triazolo[4,3-a][1,4]benzodiazepine (IIa), lithium hydride and 2-(dimethylamino)ethanol,
15. 1-bromo-8-chloro-6-(o-nitrophenyl)-4-propyl-4H-s-triazolo[4,3-a][1,4]benzodiazepine (IIa), sodium and 2-(diethylamino)ethanol,
16. 1-bromo-6-(o-bromophenyl)-8-trifluoromethyl-4H-s-triazolo[4,3-a][1,4]benzodiazepine (IIa), potassium and 2-(dimethylamino)ethanol,
17. 1,8-dibrom-6-phenyl-4H-s-triazolo[4,3-a][1,4]benzodiazepine (IIa), lithium and 2-(dimethylamino)-1-propanol,
18. 1-bromo-6-phenyl-7,9-dichloro-4H-s-triazolo[4,3-a][1,4]benzodiazepine (IIa), sodium hydride and 2-(dipropylamino)-1-butanol,
19. 1-bromo-6-(o-chlorophenyl)-4-ethyl-8-nitro-4H-s-triazolo[4,3-a][1,4]benzodiazepine (IIa), potassium hydride and 2-(diethylamino)ethanol,
20. 1-bromo-8,10-dichloro-6-(o-nitrophenyl)-4H-s-triazolo[4,3-a][1,4]benzodiazepine (IIa), sodium and 2-piperidinoethanol,
21. 1-bromo-8-chloro-6-(o-chlorophenyl)-4H-s-triazolo[4,3-a][1,4]benzodiazepine (IIa), potassium and 2-piperidinoethanol,
22. 1-bromo-8-chloro-6-(2,6-difluorophenyl)-4H-s-triazolo[4,3-a][1,4]benzodiazepine (IIa), sodium hydride and β-(4-methylpiperazino)ethanol,
23. 1-bromo-8-chloro-6-(o-chlorophenyl)-4-methyl-4H-s-triazolo[4,3-][1,4]benzodiazepine (IIa), potassiumhydride and 2-morpholinoethanol,
24. 1-bromo-8-nitro-6-phenyl-4H-s-triazolo[4,3-a][1,4]benzodiazepine (IIa), lithium hydride and 2-pyrrolidinoethanol and the like,
yields respectively,
1. 8-chloro-6-(o-chlorophenyl)-1-[2-(dimethylamino)propoxy]-4H-s-triazolo[4,3-a][1,4]benzodiazepine (Ia), 2. 8-chloro-6-(2,6-difluorophenyl)-1-[2-(dipropylamino)butoxy]-4H-s-triazolo[4,3-a][1,4]benzodiazepine (Ia),
3. 6-(2-fluoro-6-chlorophenyl)-1-[2-(ethylmethylamino)pentyloxy]-8-nitro-4H-s-triazolo[4,3-a][1,4]benzodiazepine (Ia),
4. 6-(o-chlorophenyl)-1-[2-(ethylpropylamino)ethoxy]-8-trifluoromethyl-4H-s-triazolo[4,3-a][1,4-benzodiazepine (Ia),
5. 10-ethyl-1-[2-(ethylmethylamino)propoxy]-6-phenyl-4H-s-triazolo[4,3-a][1,4]benzodiazepine (Ia),
6. 8-ethylthio-6-(o-fluorophenyl)-1-[2-(methylpropylamino)butoxy]-4H-s-triazolo[4,3-a][1,4]benzodiazepine (Ia),
7. 1-[2-(dipropylamino)pentyloxy]-6-[p-(trifluoromethyl)phenyl]-4H-s-triazolo[4,3-a][1,4-benzodiazepine (Ia),
8. 1-[2-(diethylamino)ethoxy]-8,9-di(ethylthio)-6-(o-fluorophenyl)-4H-s-triazolo[4,3-a][1,4]benzodiazepine (Ia),
9. 8,10-dichloro-6-(2,6-dichlorophenyl)-1-[2-(dipropylamino)ethoxy]-4-H-s-triazolo[4,3-a][1,4]benzodiazepine (Ia),
10. 8-chloro-1-[2-(methylpropylamino)ethoxy]-10-nitro-6-phenyl-4-H-s-triazolo[4,3-a][1,4]benzodiazepine (Ia),
11. 1-[2-(dimethylamino)propoxy]-8-nitro-6-[o -(p-ropylthio)phenyl]-10-trifluoromethyl-4H-s-triazolo[4,3-a]-[1,4benzodiazepine (Ia),
12. 1-[2-(ethylmethylamino)butoxy]-8-methylthio-6-(2-methyl-4-trifluoromethylphenyl)-4H-s-triazolo[4,3-a]-[1,4-benzodiazepine (Ia),
13. 8-chloro-6-(o-chlorophenyl)-1-[2-(dipropylamino)pentyloxy]-4-ethyl-4H-s-triazolo[4,3-a][1,4]benzodiazepine (Ia),
14. 10-bromo-6-(2-chloro-6-fluorophenyl)-1-[2-(dimethylamino)ethoxy]-4-methyl-8-nitro-4H-s-triazolo-[4,3-][1,4]benzodiazepine (Ia),
15. 8-chloro-1-[2-(diethylamino)ethoxy]-6-(o-nitrophenyl)-4-propyl-4H-s-triazolo[4,3-a][1,4]benzodiazepine (Ia), 16. 6-(o-bromophenyl)-1-[2-(dimethylamino)ethoxy]-8-trifluoromethyl-4H-s-triazolo[4,3-a][1,4]benzodiazepine (Ia),
17. 8-bromo-1-[2-(dimethylamino)propoxy]-6-phenyl-4H-s-triazolo[4,3-a][1,4-benzodiazepine (Ia),
18. 1-[2-(dipropylamino)butoxy]-6-phenyl-7,9-dichloro-4H-s-triazolo[4,3-a][1,4]benzodiazepine (Ia),
19. 6-(o-chlorophenyl)-1-[2-(diethylamino(ethoxy]-4-ethyl-8-chloro-4H-s-triazolo[4,3-a][1,4-benzodiazepine (Ia),
20. 8,10-dichloro-6-(o-nitrophenyl)-1-(2-piperidinoethoxy)-4H-s-triazolo[4,3-a][1,4]benzodiazepine (Ia),
21. 8-chloro-6-(o-chlorophenyl)-1-(2-piperidinoethoxy)-4-H-s-triazolo[4,3-a][1,4]benzodiazepine (Ia),
22. 8-chloro-6-(2,6-difluorophenyl)-1-[2-(4-methylpiperazino)ethoxy]-4H-s-triazolo[4,3-a][1,4]benzodiazepine (Ia),
23. 8-chloro-6-(o-chlorophenyl)-4-methyl-1-92-morpholinoethoxy)-4-H-s-triazolo[4,3-a][1,4]benzodiazepine (Ia), 24. 8-nitro-6-phenyl-1-(2-pyrrolidinoethoxy)-4H-s-triazolo[4,3-a][1,4]benzodiazepine (Ia), and the like.

EXAMPLE 3

8-Chloro-1-[[(2-(dimethylamino)ethyl]thio]-6-phenyl-4H-s-triazolo[4,3-a][1,4]benzodiazepine (Ib)

A mixture of 3.27 g. (0.01 mole) of 8-chloro-6-phenyl-4H-s-triazolo[4,3-a][1,4]benzodiazepine-1-thiol (IIb) (prepared as in U.S. Pat. No. 3,751,426) and 20 ml. of an aqueous 1N potassium hydroxide solution, under nitrogen, is stirred for about 2 minutes at ambient temperature. To the reaction mixture is added 100 ml. of methanol followed by 2.37 g. (0.022 mole) of 1-chloro-2-(dimethylamino)ethane in 2.37 g. of xylene. This mixture is maintained at ambient temperature for about 2 days. The mixture is concentrated under vacuum to remove the methanol, then diluted with water and extracted with methylene chloride. The extract is washed with water, dried with sodium sulfate and concentrated under vacuum. The residue is chromatographed on a 300 g. column of silica gel with 3% methanol: 97% chloroform. The thus obtained product is crystallized from diethyl ether to give 8-chloro-1-[[2-(dimethylamino)ethyl]-thio]-6-phenyl-4H-s-triazolo[4,3-a][1,4]benzodiazepine (Ib), 1.37 g. having a melting point of 127°–130° C. The analytical sample is crystallized from methylene chloride: diethyl ether: petroleum ether and has a melting point of 127° to 130.5° C.

Anal. Calcd for $C_{20}H_{20}ClN_5S$: C, 60.36; H, 5.07; Cl, 8.91; N, 17.60; S, 8.06. Found: C, 60.06; H, 5.33; Cl, 9.31; N, 17.53; S. 8.12;

Following the procedures of Example 3, but substituting other known representative 1-thio compounds of Formula IIb as starting materials and using the same or other dialkylaminoalkyl halides, the same or other alkali metal hydroxides, the same or other solvents, such as 1. 8-chloro-6-(o-chlorophenyl)-4H-s-triazolo[4,3-a[]1,4]benzodiazepine-1-thiol (IIb), potassium hydroxide, methanol and 1-chloro-2-(dimethylamino)propane,
2. 8-chloro-6-(2,6-difluorophenyl)-4H-s-triazolo-[4,3a][1,4]benzodiazepine -1-thiol (IIb), lithium hydroxide, methanol and 1-bromo-2-(dipropylamino)butane,
3. 6-(2-fluoro-6-chlorophenyl)-8-nitro-4H-s-triazolo[4,3-a][1,4]benzodiazepine-1-thiol (IIb), sodium hydroxide, ethanol and 1-chloro-2-(ethylmethylamino)pentane,
4. 6-(o-chlorophenyl)-8-trifluoromethyl-4H-s-triazolo[4,3-a] [1,4]benzodiazepine-1-thiol (IIb), potassium hydroxide, ethanol and 1-bromo-2-(ethylpropylamino)ethane,
5. 10-ethyl-6-phenyl-4H-s-triazolo[4,3-a][1,4]benzodiazepine-1-thiol (IIb) lithium hydroxide, ethanol and 1-bromo-2-(ethylmethylamino)propane,
6. 8-ethylthio-6-(o-fluorophenyl)-4H-s-triazolo[4,3-a][1,4]benzodiazepine-1thiol (IIb) sodium hydroxide, dimethylformamide and 1-chloro-2-(methylpropylamino)butane,
7. 6-[p-(trifluoromethyl)phenyl]-4H-s-triazolo[4,3-a][1,4benzodiazepine-1-thiol (IIb), potassium hydroxide, dimethylformamide and 1-bromo-2-(dipropylamino-pentane, 8. 8,9-di(ethylthio)-6-(o-fluorophenyl)-4-H-s-triazolo[4,3-a][1,4-benzodiazepine-1-thiol (IIb) lithium hydroxide, dimethylformamide and 1-chloro-2-(diethylamino)ethane,
9. 8,10-dichloro-6-(2,6-dichlorophenyl)-4H-s-triazolo[4,3-a][1,4]benzodiazepine-1-thiol (IIb), sodium hydroxide, dimethylsulfoxide and 1-bromo-2-(dipropylamino)ethane, ethane,
10. 8-chloro-10-nitro-6-phenyl-4H-s-triazolo[4,3-a][1,4]benzodiazepine -1-thiol (IIb), potassium hydroxide, dimethylsulfoxide and 1-chloro-2-(methylpropylamino)ethane.
11. 8-nitro-6-[o-(propylthio)phenyl]-10-trifluoromethyl-4H-s-triazolo[4,3-a][1,4]benzodiazepine-1-thiol (IIb), lithium hydroxide, dimethylsulfoxide and 1-bromo-2-(dimethylamino)propane,
12. 6-[2-methyl-4-(trifluoromethyl)phenyl]-8-methylthio-4H-s-triazolo[4,3-a][1,4]benzodiazepine-1-thiol (IIb), sodium hydroxide, methanol and 1-chloro-2-(ethylmethylamino)butane,
13. 8-chloro-6-(o-chlorophenyl)-4-ethyl-4-H-s-triazolo[4,3-a][1,4]benzodiazepine-1-thiol (IIb) potassium hydroxide, methanol and 1-bromo-2-(dipropylamino)pentane,
14. 10-bromo-6-(2-chloro-6-fluorophenyl)-4-methyl-8-nitro-4H-s-triazolo[4,3-a][1,4]benzodiazepine-1-thiol (IIb), lithium hydroxide, methanol and 1-chloro-2-(dimethylamino)ethane,
15. 8-chloro-6-(o-nitrophenyl)-4-propyl-4H-s-triazolo[4,3-a][1,4]benzodiazepine-1-thiol (IIb) sodium hydroxide, ethanol, and 1-bromo-2-(diethylamino)ethane,
16. 6-(o-bromophenyl)-8-trifluoromethyl-4H-s-triazolo[4,3-a][1,4 benzodiazepine-1-thiol (IIb), potassium hydroxide, ethanol, and 1-chloro-2-(dimethylamino)ethane,
17. 8-bromo-6-phenyl-4H-s-triazolo[4,3-a][1,4]benzodiazepine-1-thiol (IIb), lithium hydroxide, ethanol and 1-bromo-2-(dimethylamino)propane,
18. 7,9-dichloro-6-phenyl-4H-s-triazolo[4,3-a]-[1,4]benzodiazepine-1-thiol (IIb), sodium hydroxide, dimethylformamide, and 1-chloro-2-(dipropylamino)butane,
19. 9-bromo-6-(2,3-diethylphenyl)-4-ethyl-8-nitro-4H-s-triazolo[4,3-a][1,4]benzodiazepine-1-thiol (IIb), potassium hydroxide, dimethylformamide, and 1-bromo-2-(dipropylamino)pentane,
20. 8,10-dichloro-6-(o-nitrophenyl)-4H-s-triazolo[4,3-a][1,4]benzodiazepine-1-thiol (IIb) lithium hydroxide, dimethylformamide and 1-chloro-2-piperidinoethane,
21. 8-chloro-6-(o-chlorophenyl)-4H-s-triazolo[4,3-a][1,4]benzodiazepine-1-thiol (IIb), sodium hydroxide, dimethylsulfoxide and 1-bromo-2-piperidinoethane,
22. 8-chloro-6-(2,6-difluorophenyl)-4-H-s-triazolo[4,3-a][1,4]benzodiazepine-1-thiol (IIb), potassium hydroxide, dimethylsulfoxide and 1-chloro-2-(4-methylpiperazine)ethane,
23. 8-chloro-6-(o-chlorophenyl)-4-methyl-4H-s-triazolo[4,3-a][1,4]benzodiazepine-1-thiol (IIb), lithium hydroxide, dimethysulfoxide and 1-bromo-2-morpholinoethane,
24. 8-nitro-6-phenyl-4H-s-triazolo[4,3-a][1,4]benzodiazepine-1-thiol (IIb), sodium hydroxide ethanol and 1-chloro-2-pyrrolidinoethane, and the like, yields, respectively, 1. 8-chloro-6-(o-chlorophenyl)-1-[[2-(dimethylamino)propyl]thio]-4-H-s-triazolo[4,3-a][1,4]benzodiazepine (Ib),
2. 8-chloro-6-(2,6-difluorophenyl)-1-[[2-(dipropylamino)butyl]thio ]-4-H-s-triazolo[4,3-a][1,4]benzodiazepine (Ib),
3. 6-(2-fluoro-6-chlorophenyl)-1-[[2-(ethylmethylamino)pentyl]thio]-8-nitro-4H-s-triazolo[4,3-a][1,4]benzodiazepine (Ib),
4. 6-(o-chlorophenyl)-1-[[2-(ethylpropylamino)ethyl]thio]-8-trifluoromethyl-4H-s-triazolo[4,3-a][1,4]-benzodiazepine (Ib),
5. 10-ethyl-1-[[2-ethylmethylamino)propyl]thio]6-phenyl-4H-s-triazolo[4,3-a][1,4]benzodiazepine (Ib),
6. 8-ethylthio-6-(o-fluorophenyl)-1-[[2-(methylpropylamino)butyl]thio]-4-H-s-triazolo[4,3-a][1,4]benzodiazepine (Ib),
7. 1-[[2-(dipropylamino)pentyl]thio]-6-[p-(trifluoromethyl)phenyl]-4H-s-triazolo[4,3-a][1,4]benzodiazepine (Ib),
8. 1-[[2-9diethylamino)ethyl]thio]-8,9-di(ethylthio)-6-(o-fluorophenyl)-4H-s-triazolo[4,3-a][1,4]benzodiazpine (Ib),
9. 8,10-dichloro-6-(2,6-dichlorophenyl)-1-[[2-(dipropylamino)ethyl]thio]-4H-s-triazolo[4,3-a][1,4]benzodiazepine (Ib),
10. 8-chloro-1-[[2-(methylpropylamino)ethyl]thio]10-nitro-6-phenyl-4H-s-triazolo[4,3-a][1,4]benzodiazepine (Ib),
11. 1-[[2-(dimethylamino)propyl]thio]-8-nitro-6-[o-(propylthio)phenyl]-10-trifluoromethyl-4H-s-triazolo[4,3-a][1,4]benzodiazepine (Ib),
12. 1-[[2-(ethylmethylamino)butyl]thio]-8-methylthio-6-(2-methyl-4-trifluoromethylphenyl)-4-H-s-triazolo[4,3-a][1,4]benzodiazepine (Ib),
13. 8-chloro-6-(o-chlorophenyl)-1-[[2-(dipropylamino)pentyl]thio]-4-ethyl-4-H-s-triazolo[4,3-a][1,4]benzodiazepine (Ib),
14. 10-bromo-6-(2-chloro-6-fluorophenyl)-1-[[2-(dimethylamino)ethyl]thio]-4-methyl-8-nitro-4H-s-triazolo[4,3a][1,4]benzodiazepine (Ib),
15. 8-chloro-1[[2-(diethylamino)ethyl]thio]-6-(o-nitrophenyl)-4-propyl-4H-s-triazolo[4,3-a][1,4]benzodiazepine (Ib),
16. 6-(o-bromophenyl)-1-[[2-(dimethylamino) ethyl]-thio]-8-trifluoromethyl-4H-s-triazolo[4,3-a][1,4]benzodiazepine (Ib),
17. 8-bromo-1-[[2-(dimethylamino)propyl]thio]-6-phenyl-4H-s-triazolo[4,3-a][1,4]benzodiazepine (Ib),
18. 1-[[2-dipropylamino)butyl]thio]-7,9-dichloro-6-phenyl-4H-s-triazolo[4,3-a][1,4]benzodiazepine (Ib),
19. 9bromo-6-(2,3-diethylphenyl)-1-[[2-(dipropylamino)pentyl]thio]-4-ethyl-8-nitro-4H-s-triazolo[4,3-a][1,4]benzodiazepine (Ib),
20. 8,10-dichloro-6-(o-nitrophenyl)-1-[(2-piperidinoethyl)thio]-4H-s-triazolo[4,3-a][1,4]benzodiazepine (Ib),
21. 8-chloro-6-(o-chlorophenyl)-1-[(2-piperidinoethyl)thio]-4H-s-triazolo[4,3-a][1,4]benzodiazepine (Ib), 22. 8-chloro-6-(2,6-difluorophenyl)-1-[[2-(4-methylpiperazino)ethyl]thio]-4H-s-triazolo[4,3-a][1,4]benzodiazepine (Ib),
23. 8-chloro-6-(o-chlorophenyl)-4-methyl-1-[(2-morpholinoethyl)thio]-4H-s-triazolo[4,3-a][1,4]benzodiazepine (Ib),
24. 8-nitro-6-phenyl-1-[(2-pyrrolidinoethyl)thio]4H-s-triazolo[4,3-a][1,4]benzodiazepine (Ib), and the like.

EXAMPLE 4

8-Chloro-1-[[2-(dimethylamino)ethyl]methylamino]-6-phenyl-4H-s-triazolo[4,3-a][1,4]benzodiazepine (Ic)

A mixture of 25 ml. of [2-(dimethylamino)ethyl]methylamine and 1.87 g. (0.005 mole) of 1-bromo-8-chloro-6-phenyl-4H-s-triazolo[4,3-a][1,4]benzodiazepine (IIa) is heated at 100°C for 3 days. The mixture is then diluted with water and extracted with methylene chloride. The extract is washed with water, then brine, dried with sodium sulfate and concentrated under vacuum. The residue is chromatographed on a 200 g. column of silica gel with 5% methanol; 95% chloroform. The thus obtained product is treated with activated carbon (Darco) and recrystallized twice from ethyl acetate: Skellysolve B to give 0.32 g. of 8-chloro-1-[[2-(dimethylamino)ethyl]methylamino]-6-phenyl-4H-s-triazolo[4,3-a][1,4]benzodiazepine (Ic), having a melting point of 135°-140° C. and 0.21 g. having a melting point of 125°-136° C.

Anal. Calcd. for $C_{21}H_{23}ClN_6$: C, 63.87; H, 5.87; Cl, 8.98; N, 21.28. Found; C, 64.06 ; H, 6.14; Cl, 9.08; N, 21.10.

Following the procedures of Example 4, but substituting other known representative 1-bromo compounds of Formula IIa as starting materials and using the same or other triakylethylenediamenes, such as,
1. 1-bromo-8-chloro-6-(o-chlorophenyl)-4H-s-triazolo[4,3-a]benzodiazepine (IIa) and [2-(dimethylamino)ethyl]methylamine,
2. 1-bromo-8-chloro-6-(2,6-difluorophenyl)-4H-s-triazolo[4,3-a][1,4]benzodiazepine (IIa), and [2-(dipropylamino)butyl]methylamine,
3. 1-bromo-6-(2-fluoro-6-chlorophenyl)-8-nitro-4H-s-triazolo[4,3-a][1,4]benzodiazepine (IIa), and [2-(ethylmethylamino)pentyl]methylamine,
4. 1-bromo-6-(o-chlorophenyl)-8-trifluoromethyl-4H-s-triazolo[4,3a][1,4]benzodiazepine (IIa), and [2-ethylpropylamino)ethyl]methylamine,
5. 1-bromo-10-ethyl-6-phenyl-4H-s-triazolo[4,3-a][1,4]benzodiazepine (IIa), and [2-(ethylmethylamino)-propyl]methylamine,
6. 1-bromo-8ethylthio-6-(o-fluorophenyl)-4H-s-triazolo[ 4,3-a][1,4]benzodiazepine (IIa), a), and [2-(methylpropylamino)butyl]methylamine.
7. 1-bromo-6-[p-(trifluoromethyl)phenyl]-4H-s-triazolo[4,3-a][1,4]benzodiazepine (IIa), and [2-(dipropylamino)pentyl]methylamine,
8. 1-bromo-8,9-di(ethylthio)-6-(o-fluorophenyl)-4H-s-triazolo[4,3-a][1,4]benzodiazepine (IIa), and [2-(diethylamino)ethyl]methylamine,
9. 1-bromo-8,10-dichloro-6-(2,6-dichlorophenyl)-4H-s-triazolo[4,3-a][1,4]benzodiazepine (IIa), and [2-(dipropylamino)ethyl]methylamine,
10. 1-bromo-8-chloro-10-nitro-6-phenyl-4H-s-triazolo[4,3-a][1,4]benzodiazepine (IIa), and [2-(methylpropylamino)ethyl]methylamine,
11. 1-bromo-6-]o-(propylthio)phenyl]-8-nitro-10-trifluoromethyl-4H-s-triazolo[4,3-a][1,4]benzodiazepine (IIa), and [2-(dimethylamino)propyl]ethylamine,
12. 1-bromo-6-(2-methyl-4-trifluoromethylphenyl)-8-methylthio-4H-s-triazolo[4,3-a][1,4]benzodiazepine (IIa), and [2-(ethylmethylamino)butyl]ethylamine,
13. 1-bromo-8-chloro-6-(o-chlorophenyl)-4-ethyl-4H-s-triazolo[4,3-a][1,4]benzodiazepine (IIa), and [2-(dipropylamino)pentyl]ethylamine,
14. 1, 10-dibromo-6-(2-chloro-6-fluorophenyl)-4-methyl-8-nitro-4H-s-triazolo[4,3-a][1,4]benzodiazepine (IIa), and [2-(dimethylamino)ethyl]ethylamine,
15. 1-bromo-8-chloro-6-(o-nitrophenyl)-4-propyl-4H-s-triazolo[4,3-a][1,4]benzodiazepine (IIa), and [2-(dimethylamino]ethylamine,
16. 1-bromo-6-(o-bromophenyl)-8-trifluoromethyl-4H-s-triazolo[4,3-a][1,4]benzodiazepine (IIa), and [2-(dimethylamino)ethyl]ethylamine,
17. 1,8-dibromo-6-phenyl-4H-s-triazolo[4,3-a][1,4]benzodiazepine (IIa), and [2-(dimethylamino)propyl]ethylamine,
18. 1-bromo-7,9-dichloro-6-phenyl-4H-s-triazolo[4,3-][1,4]benzodiazepine (IIa), and [2-(dipropylamino)-butyl]ethylamine,
19. 1,9-dibromo-6-(2,3-diethylphenyl)-4-ethyl-8-nitro-4H-s-triazolo[4,3-a][1,4]benzodiazepine (IIa), and [2-(dipropylamino)pentyl]ethylamine,
20. 1-bromo-8,10-dichloro-6-(o-nitrophenyl)-4H-s-triazolo[4,3-a][1,4] benzodidazepine (IIa), and (2-piperidinoethyl)methylamine,
21. 1-bromo-8-chloro-6-(o-chlorophenyl)-4H-s-triazolo[4,3-a][1,4]benzodiazepine (IIa), and (2-piperidinoethyl)ethylamine;
22. 1-bromo-8-chloro-6-(2,6-difluorophenyl)-4H-s-triazolo[4,3-a][1,4]benzodiazepine (IIa), and [2-(4-methylpiperazino)ethyl]methylamine,
23. 1-bromo-8-chloro-6-(o-chlorophenyl)-4-methyl-4H-s-triazolo[4,3-a][1,4]benzodiazepine (IIa), and (2-morpholinoethyl)methylamine,
24. 1-bromo-8-nitro-6-phenyl-4H-s-triazolo[4,3-a][1,4]benzodiazepine (IIa), and (2-pyrrolidinoethyl)methylamine, and the like,
yields, respectively,
1. 8-chloro-6-(o-chlorophenyl)-1-[[2-(dimetylamino)ethyl]methylamino]-4H-s-triazolo[4,3-a][1,4]benzodiazepine (Ic),
2. 8-chloro-6-(2,6-difluorophenyl)-1-[[2-(dipropylamino)butyl]methylamino]-4H-s-triazolo[4,3-a][1,4]benzodiazepine (Ic),
3. 6-(2-fluoro-6-chlorophenyl)-1-[[2-(ethylmethylamino)pentyl]methylamino]-8-nitro-4H-s-triazolo[4,3-a][1,4]-benzodiazepine (Ic),
4. 6-(o-chlorophenyl)-1-[[2-(ethylpropylamino)ethyl]-methylamino]-8-trifluoromethyl-4H-s-triazolo[4,3-a][1,4]-benzodiazepine (Ic),
5. 10-ethyl-1-[[2-(ethylmethylamino)propyl]methylamino]-6-phenyl-4H-s-triazolo[4,3-a][1,4]benzodiazepine (Ic),
6. 8-ethylthio-6-(o-fluorophenyl)-1-[[2-methylpropylamino)butyl]methylamino]-4H-s-triazolo[4,3-a][1,4]-benzodiazepine (Ic), 7. 1-[[2-(dipropylamino)pentyl]methylamino]-6-[p-(trifluromethyl)phenyl]-4H-s-triazolo[4,3-a][1,4]benzodiazepine (Ic),
8. 1-[[2-(diethylamino)ethyl]methylamino]-8,9-di(ethylthio)-6-(o-fluorophenyl)-4H-s-triazolo[4,3-a][1,4]-benzodiazepine (Ic),
9. 8,10-dichloro-6-(2,6-dichlorophenyl)-1-[[2-dipropylamino)ethyl]methylamino]-4H-s-triazolo[4,3-a][1,4]-benzodiazepine (Ic),
10. 8-chloro-1-[[2-(methylpropylamino)ethyl]methylamino]-10-nitro-6-phenyl-4H-s-triazolo[4,3-a][1,4]benzodiazepine (Ic),
11. 1-[[2-(dimethylamino)propyl]ethylamino]-6-[o-(propylthio)phenyl]-8-nitro-10-trifluromethyl-4H-s-triazolo[4,3-a][1,4]benzodiazepine (Ic)
12. 1-[[2-(ethylmethylamino)butyl]ethylamino]-6-(2-methyl-4-trifluoromethylphenyl)-8-methylthio-4H-s-triazolo[4,3-a][1,4]benzodiazepine (Ic),
13. 8-chloro-6-(o-chlorophenyl)-1-[[2-(dipropylamino)pentyl]ethylamino]-4-ethyl-4H-s-triazolo[4,3-a][1,4]-benzodiazepine (Ic),
14. 10-bromo-6-(2-chloro-6-fluorophenyl)-1-[[2-(dimethylamino)ethyl]ethylamino]-4-methyl-8-nitro-4H-s-triazolo[4,3-a][1,4]benzodiazepine (Ic),
15. 8-chloro-1-[[2-(diethylamino)ethyl]ethylamino]-6-(o-nitrophenyl)-4-propyl-4H-s-triazolo[4,3-a][1,4]benzodiazepine (Ic),
16. 6-(o-bromophenyl)-1-[[2-(dimethylamino)ethyl]-ethylamino]-8-trifluoromethyl-4H-s-triazolo[4,3-a][1,4]-benzodiazepine (Ic),
17. 8-bromo-1-[[2-(dimethylamino)propyl]ethylamino]-6-phenyl-4H-s-triazolo[4,3-a][1,4]-benzodiazepine (Ic),
18. 7,9-dichloro-1-[[2-(dipropylamino)butyl]ethylamino]-6-phenyl-4H-s-triazolo[4,3-a][1,4]benzodiazepine (Ic),
19. 9-bromo-6-(2,3-diethylphenyl)-1-[[2-(dipropylamino)pentyl]ethylamino]-4-ethyl-8-nitro-4H-s-triazolo[4,3-a][1,4]benzodiazepine (Ic),
20. 8,10-dichloro-6-(o-nitrophenyl)-1-[2-(piperidinoethyl)methylamino]-4H-s-triazolo[4,3-benzodiazepine (Ic),
21. 8-chloro-6-(o-chlorophenyl)-1-[2-(piperidinoethyl)ethylamino]-4H-s-triazolo[4,3-a][1,4]benzodiazepine (Ic),
22. 8-chloro-6-(2,6-difluorophenyl)-1-[[2-(4-methylpiperazino)ethyl]methylamino]-4H-s-triazolo[4,3-a]-[1,4]benzodiazepine (Ic),
23. 8-chloro-6-(o-chlorophenyl)-4-methyl-1-[2-(morpholinoethyl)methylamino]4H-s-triazolo[4,3-a][1,4]-benzodiazepine (Ic),
24. 8-nitro-6-phenyl-1-[2-(pyrrolidinoethyl)methylamino]-4H-s-triazolo[4,3-a][1,4]benzodiazepine (Ic), and the like.

In the manner illustrated by the foregoing examples, other compounds of Formula I can be synthesized. Representative compounds of Formula 1, that can be thus prepared include:

8-chloro-6(o-chlorophenyl)-1-[2-(dimethylamino)-ethoxy]-4H-s-triazolo[4,3-a][1,4]benzodiazepine,
6-(o-chlorophenyl)-1-[2-(dimethylamino)ethoxy]-4H-s-triazolo[4,3-a][1,4]benzodiazepine,
8-chloro-6-(2,6-difluorophenyl)-1-[2-(dimethylamino)-ethoxy]-4H-s-triazolo[4,3-a][1,4]benzodiazepine,
8-chloro-6-phenyl-1-[2-(dimethylamino)propoxy]-4H-s-triazolo[4,3-a][1,4]benzodiazepine,
6-(o-chlorophenyl)-1-[2-(dimethylamino)propoxy]-4H-s-triazolo[4,3-a][1,4]benzodiazepine,
8-chloro-6-phenyl-1-[2-(dimethylamino)-1-methylethoxy]-4H-s-triazolo[4,3-a][1,4]benzodiazepine,
8-chloro-6-(o-chlorophenyl)-1-[2-(dimethylamino)-1-methylethoxy]-4H-s-triazolo[4,3-a][1,4]benzodiazepine,
6-(o-chlorophenyl)-1-[2-(dimethylamino)-1-methylethoxy]-4H-s-triazolo[4,3-a][1,4]benzodiazepine,
8-chloro-6-(2,6-difluorophenyl)-1-[2-(dimethylamino)-1-methylethoxy]-4H-s-triazolo[4,3-a][1,4]benzodiazepine,
8-chloro-6-phenyl-1-[2-(dimethylamino)butoxy]-4H-s-triazolo[4,3-a][1,4] benzodiazepine,
8-chloro-6-(o-chlorophenyl)-1-[2-(dimethylamino)-butoxy]-4H-s-triazolo[4,3-a][1,4]benzodiazepine,
6-(o-chlorophenyl)-1-[2-(dimethylamino)butoxy]-4H-s-triazolo[4,3-a][1,4]benzodiazepine,
8-chloro-6-phenyl-1-[2-(dimethylamino)-1-ethyl-ethoxy]-4H-s-triazolo[4,3-a][1,4]benzodiazepine,
8-chloro-6-(o-chlorophenyl)-1-[2-(dimethylamino)-1-ethylethoxy]-4H-s-triazolo[4,3-a][1,4]benzodiazepine,
8-chloro-6-phenyl-1-[2-(dimethylamino)pentyloxy]-4H-s-triazolo[4,3-a][1,4]benzodiazepine,
8-chloro-6-(o-chlorophenyl)-1-[2-(dimethylamino)-pentyloxy]-4H-s-triazolo[4,3-a][1,4]benzodiazepine,
8-chloro-6-phenyl-1-[2-(dimethylamino)-1-propylethoxy]-4H-s-triazolo[4,3-a][1,4]benzodiazepine,
8-chloro-6-(o-chlorophenyl)-1-[2-(dimethylamino)-1-propylethoxy]-4H-s-triazolo[4,3-a][1,4]benzodiazepine,
8-chloro-6-phenyl-1-[2-(dimethylamino)-1-methylpropoxy]-4H-s-triazolo[4,3-a][1,4]benzodiazepine,
8-chloro-6-(o-chlorophenyl)-1-[2-(dimethylamino)-1-methylpropoxy]-4H-s-triazolo[4,3-a][1,4]benzodiazepine,
8-chloro-6-phenyl-1-(2-aminoethoxy)-4H-s-triazolo-[4,3-a][1,4]benzodiazepine,
8-chloro-6-(o-chlorophenyl)-1-(2-aminoethoxy)-4H-s-triazolo[4,3-a][1,4]benzodiazepine,
8-chloro-6-phenyl-1-[2-(methylamino)ethoxy]-4H-s-triazolo[4,3-a][1,4]benzodiazepine,
8-chloro-6-(o-chlorophenyl)-1-[2-(methylamino)-ethoxy]-4H-s-triazolo[4,3-a][1,4]benzodiazepine,
8-chloro-6-(o-chlophenyl)-1-[[2-(dimethylamino)-ethyl]thio]-4H-s-triazolo[4,3-a][1,4]benzodiazepine,
6-(o-chlorophenyl)-1-[[2-(dimethylamino)ethyl]thio]-4H-s-triazolo[4,3-a][1,4]benzodiazepine,
8-chloro-6-(2,6-difluorophenyl)-1-[[2-(dimethylamino)ethyl]thio]-4H-s-triazolo[4,3-a][1,4]benzodiazepine, 8-chloro-1-[[2-(dimethylamino)propyl]thio]-6-phenyl-4H-s-triazolo[4,3-a][1,4]benzodiazepine,
6-(o-chlorophenyl)-1-[[2-(dimethylamino)propyl]thio]-4H-s-triazolo[4,3-a][1,4]benzodiazepine,
8-chloro-1-[[2-(dimethylamino)-1-methylethyl]thio]-6-phenyl-4H-s-triazolo[4,3-a][1,4]benzodiazepine,
8-chloro-6-(o-chlorophenyl)-1-[[2-(dimethylamino)-1-methylethyl]thio]-4H-s-triazolo[4,3-a][1,4]benzodiazepine,
6-(o-chlorophenyl)-1-[[2-(dimethylamino)-1-methylethyl]thio]-4H-s-triazolo[4,3-a][1,4]benzodiazepine,
8-chloro-6-(2,6-difluorophenyl)-1-[[2-(dimethylamino)-1-methylethyl]thio]-4H-s-triazolo[4,3-a][1,4]benzodiazepine,
8-chloro-1-[[2-(dimethylamino)butyl]thio]-6-phenyl-4H-s-triazolo[4,3-a][1,4]benzodiazepine,
8-chloro-6-(o-chlorophenyl)-1-[[2-(dimethylamino)-butyl]thio]-4H-s-triazolo[4,3-a][1,4]benzodiazepine,
6-(o-chlorophenyl)-1-[[2-(dimethylamino)butyl]thio]-4H-s-triazolo[4,3-a][1,4]benzodiazepine,
8-chloro-1-[[2-(dimethylamino)-1-ethylethyl]thio]6-phenyl-4H-s-triazolo[4,3-a][1,4]benzodiazepine,
8-chloro-6-(o-chlorophenyl)-1-[[2-(dimethylamino)-1-ethylethyl]thio]-4H-s-triazolo[4,3-][1,4 benzodiazepine,
8-chloro-1-[[2-(dimethylamino)pentyl]thio]-6-phenyl-4H-s-triazolo[4,3-a][1,4]benzodiazepine,
8-chloro-6-(o-chlorophenyl)-1-[]2-(dimethylamino)-pentyl]thio]-4H-s-triazolo[4,3-a][1,4]benzodiazepine,
8-chloro-1-[[2-(dimethylamino)-1-propylethyl]thio]-6-phenyl-4H-s-triazolo[4,3-a][1,4]benzodiazepine,
8-chloro-6-(o-chlorophenyl)-1-[[2-(dimethylamino)-1-propylethyl]thio]-4H-s-triazolo[4,3-a][1,4]benzodiazepine,
8-chloro-1-[[2-(dimethylamino)-1-methylpropyl]thio]-6-phenyl-4H-s-triazolo[4,3-a][1,4]benzodiazepine,
8-chloro-6-(o-chlorophenyl)-1-[[2-(dimethylamino)-1-methylpropyl]thio]-4H-s-triazolo[4,3-a][1,4]benzodiazepine,
8-chloro-6-phenyl-1-[2-(aminoethyl)thio]-4H-s-triazolo[4,3-a][1,4]benzodiazepine,
8-chloro-6-(o-chlorophenyl)-1-[2-(aminoethyl)thio]-4H-s-triazolo[4,3-a][1,4]benzodiazepine,
8-chloro-6-phenyl-1-[[2-(methylamino)ethyl]thio]4H-s-triazolo[4,3-a][1,4]benzodiazepine,
8-chloro-6-(o-chlorophenyl)-1-[[2-(methylamino)ethyl]-thio]-4H-s-triazolo[4,3-a][1,4]benzodiazepine,
8-chloro-6-(o-chlorophenyl)-1-[[2-(dimethylamino)-ethyl]methylamino]-4H-s-triazolo[4,3-a][1,4]benzodiazepine,
6-(o-chlorophenyl)-1-[[2-(dimethylamino)ethyl]methylamino]-4H-s-triazolo[4,3-a][1,4]benzodiazepine,
8-chloro-6-(2,6-difluorophenyl)-1-[[2-(dimethylamino)ethyl]methylamino]-4H-s-triazolo[4,3-a][1,4]benzodiazepine,
8-chloro-1-[[2-(dimethylamino)propyl]methylamino]-6-phenyl-4H-s-triazolo[4,3-a][1,4]benzodiazepine,
6-(o-chlorophenyl)-1-[[2-(dimethylamino)propyl]methylamino]-4H-s-triazolo[4,3-a][1,4]benzodiazepine,
8-chloro-1-[[2-(dimethylamino)-1-methylethyl]methylamino]-6-phenyl-4H-s-triazolo[4,3-a][1,4]benzodiazepine,
8-chloro-6-(o-chlorophenyl)-1-[[2-(dimethylamino)-1-methylethyl]methylamino]-4H-s-triazolo[4,3-a][1,4]benzodiazepine,
6-(o-chlorophenyl)-1-[[2-(dimethylamino)-1-methylethyl]ethylamino]-4H-s-triazolo[4,3-a][1,4]benzodiazepine,
8-chloro-6-(2,6-difluorophenyl)-1-[[2-(dimethylamino)-1-methylethyl]ethylamino]-4H-s-triazolo[4,3-a]-[1,4]benzodiazepine,
8-chloro-1-[[2-(dimethylamino)butyl]ethylamino]-6-phenyl-4H-s-triazolo[4,3-a][1,4]benzodiazepine,
8-chloro-6-(o-chlorophenyl)-1-[[2-(dimethylamino)-butyl]ethylamino]-4H-s-triazolo[4,3-a][1,4]benzodiazepine,
6-(o-chlorophenyl)-1-[[2-(dimethylamino)butyl]ethylamino]-4H-s-triazolo[4,3-a][1,4]benzodiazepine,
8-chloro-1-[[2-(dimethylamino)-1-ethyl ethyl]ethylamino]-6-phenyl-4H-s-triazolo[4,3-a][1,4]benzodiazepine,
8-chloro-6-(o-chlorophenyl)-1-[[2-(dimethylamino)-1-ethylethyl]ethylamino]-4H-s-triazolo[4,3-a][1,4]benzodiazepine,
8-chloro-1-[[2-dimethylamino)pentyl]propylamino]-6-phenyl-4H-s-triazolo[4,3-][1,4]benzodiazepine,
8-chloro-6-(o-chlorophenyl)-1-[[2-(dimethylamino)-pentyl]propylamino]-4H-s-triazolo[4,3-a[[1,4]benzodiazepine,
8-chloro-1-[[2-(dimethylamino)-1-propylethyl]propylamino]-6-phenyl-4H-s-triazolo[4,3-a][1,4]benzodiazepine,
8-chloro-6-(o-chlorophenyl)-1-[[2-(dimethylamino)-1-propylethyl]propylamino]-4H-s-triazolo[4,3-a][1,4]benzodiazepine,
8-chloro-1-[[2-(dimethylamino)-1-methylpropyl]methylamino]-6-phenyl-4H-s-triazolo[4,3-a][1,4]benzodiazepine, and
8-chloro-6-(o-chlorophenyl)-1-[[2-(dimethylamino)-1-methylpropyl]methylamino]-4H-s-triazolo[4,3-a][1,4]benzodiazepine.

I claim:

1. A compound of the formula

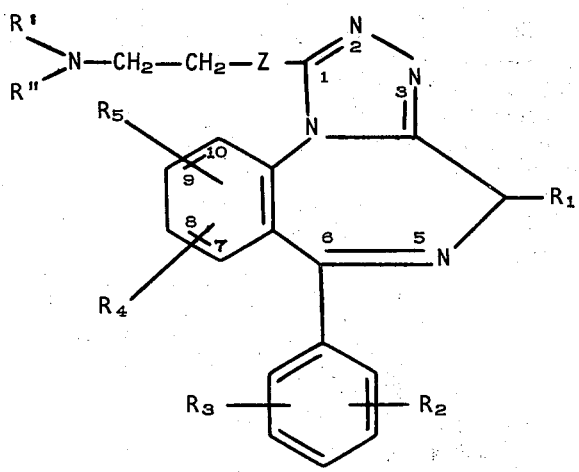

wherein Z is selected from the group consisting of O, S and N—R''' wherein R''' is lower alkyl of 1 through 3 carbon atoms; $R_1$ is selected from the group consisting of hydrogen and lower alkyl of 1 through 3 carbon atoms; R' and R'' are selected from the group consisting of hydrogen and lower alkyl of 1 through 3 carbon atoms, with the proviso that R' and R'' cannot be hydrogen when Z is N—R'''; $R_2$, $R_3$, $R_4$ and $R_5$ are selected from the group consisting of hydrogen, lower alkyl of 1 through 3 carbon atoms, fluorine, chlorine, bromine, nitro, trifluoromethyl and lower alkylthio of 1 through 3 carbon atoms; and pharmacologically acceptable acid addition salts thereof.

2. A compound of claim 1 wherein Z is O, R, $R_o$ and $R_1$ are hydrogen, R' and R'' are methyl, $R_2$, $R_3$ and $R_5$ are hydrogen and $R_4$ is 8-chloro, namely, 8-chloro-1-[2-(dimethylamino)ethoxy]-6-phenyl-4H-s-triazolo[4,3-a][1,4]benzodiazepine, 3. A compound of claim 1 wherein Z is O, R, $R_o$, and $R_1$ are hydrogen, R' and R'' are methyl, $R_3$ and $R_5$ are hydrogen, $R_2$ is ortho-chloro and $R_4$ is 8-chloro, namely, 8-chloro-1-[2-(dimethylamino)ethoxy]-6-(o-chlorophenyl)-4H-s-triazolo[4,3-a][1,4]benzodiazepine.

4. A compound of claim 1 wherein Z is O, R, $R_o$ and $R_1$ are hydrogen, R' and R'' are ethyl, $R_2$, $R_3$ and $R_5$ are hydrogen and $R_4$ is 8-chloro, namely 8-chloro-1-[2-(diethylamino)ethoxy]-6-phenyl-4H-s-triazolo[4,3-a][1,4]benzodiazepine.

5. A compound of claim 1 wherein Z is O, R, $R_o$ and $R_1$ are hydrogen R' and R'' are ethyl, $R_3$ and $R_5$ are hydrogen, $R_2$ is ortho-chloro and $R_4$ is 8-chloro, namely, 8-chloro-1-[2-(diethylamino)ethoxy]-6-(o-chclorophenyl)-4H-s-triazolo[4,3-a][1,4 benzodiazepine.

6. A compound of claim 1 wherein Z is S, R, $R_o$ and $R_1$ are hydrogen, R' and R'' are methyl, $R_2$, $R_3$ and $R_5$ are hydrogen and $R_4$ is 8-chloro, namely, 8-chloro-1-[[2-(dimethylamino)ethyl]thio]-6-phenyl-4H-s-triazolo[4,3-a]-[1,4]benzodiazepine.

7. A compound of claim 1 wherein Z is S, R, $R_o$ and $R_1$ are hydrogen, R' and R'' are methyl, $R_3$ and $R_5$ are hydrogen, $R_2$ is ortho-chloro and $R_4$ is 8-chloro, namely, 8-chloro-1-[[2-(dimethylamino)ethyl]thio]-6-(o-chlorophenyl)-4H-s-triazolo[4,3-a][1,4 benzodiazepine 8. A compound of claim 1 wherein Z is N—R''' wherein R''' is methyl, R, $R_o$ and $R_1$ are hydrogen, R' and R'' are methyl, $R_2$, $R_3$ and $R_5$ are hydrogen and $R_4$ is 8-chloro, namely, 8-chloro-1-[[2-(dimethylamino)ethyl]methylamino]-6-phenyl-4H-s-triazolo[4,3-a][1,4]benzodiazepine.

9. A compound of claim wherein Z is N-R''' wherein R''' is methyl, R, $R_o$ and $R_1$ are hydrogen, R' and R'' are methyl, $R_3$ and $R_5$ are hydrogen, $R_2$ is ortho-chloro and $R_4$ is 8-chloro, namely, 8-chloro-1-[[2-(dimethylamino)ethyl]-methylamino]6-(o-chlorophenyl)-4H-s-Triazolo[4,3-a][1,4]-benzodiazepine.

* * * * *